United States Patent [19]
Franklin

[11] Patent Number: 5,920,962
[45] Date of Patent: Jul. 13, 1999

[54] CLAMPING DEVICE FOR ANTISKID CHAINS

[75] Inventor: Charles R. Franklin, Udine, Italy

[73] Assignee: Acciaierie Weissenfels S.p.A., Unna, Germany

[21] Appl. No.: 09/068,603

[22] PCT Filed: Sep. 8, 1997

[86] PCT No.: PCT/EP97/04874

§ 371 Date: Aug. 19, 1998

§ 102(e) Date: Aug. 19, 1998

[87] PCT Pub. No.: WO98/09831

PCT Pub. Date: Mar. 12, 1998

[30] Foreign Application Priority Data

Sep. 9, 1996 [DE] Germany ............ 196 36 544

[51] Int. Cl.⁶ .................................................. F16G 15/00
[52] U.S. Cl. .............................. 24/116 R; 24/299; 59/93
[58] Field of Search ........................... 24/116 R, 116 A, 24/299, 662, 682.1; 59/93

[56] References Cited

U.S. PATENT DOCUMENTS

| | | | |
|---|---|---|---|
| 813,277 | 2/1906 | Cage | 59/93 |
| 2,014,201 | 9/1935 | Field | 24/116 R |
| 2,904,347 | 9/1959 | Tucker | 24/116 R |
| 3,521,443 | 7/1970 | Dragonuk | 59/93 |

FOREIGN PATENT DOCUMENTS

| | | |
|---|---|---|
| 84 02 467 | 3/1984 | Germany . |
| 89 02 454 | 4/1989 | Germany . |
| 39 30 613 | 3/1991 | Germany . |
| 296 15 694 | 10/1996 | Germany . |

*Primary Examiner*—Victor N. Sakran
*Attorney, Agent, or Firm*—McAulay Nissen Goldberg Kiel & Hand, LLP

[57] ABSTRACT

In a clamping lock with a housing having a deflecting element for a tension chain which runs over it, wherein a pawl is provided which is swivelable between an open position and a locking position and is pretensioned against the deflecting element and has a projecting nose by which the tension chain can be locked in the direction opposite to the tensioning direction, and with a slot on the side of the housing which extends over the entire height of the housing, through which slot the tension chain is introduced into the housing and can be fitted on the deflecting element, the nose is constructed as a shaped nose which can be introduced into the intermediate space between two longitudinal sides of a chain link of the tension chain and which, with its nose surface located in front in the direction of the locking position, constitutes an extension, substantially in a straight line, of the outer surface of a pawl leg leading to the swivel pin of the pawl and is provided with a guide groove which is located in the center and which extends into this outer surface of the pawl leg, wherein a chain link of the tension chain can be at least partially introduced into the guide groove by its outer side.

12 Claims, 3 Drawing Sheets

CLAMPING DEVICE FOR ANTISKID CHAINS

BACKGROUND OF THE INVENTION a) Field of the Invention

The invention is directed to a tension shackle or clamping lock for antiskid chains with a housing having a deflecting element for a tension chain which runs over it, with a pawl which is swivelable between an open position and a locking position and which is pretensioned in a springing manner in its locking position against the deflecting element and has a projecting nose with which it locks the tension chain so as to prevent it from running through in the tensioning direction, and with a slot that is arranged on the side of the housing and extends over the entire height of the housing, through which slot the tension chain is introduced laterally into the housing from the outside and can be fitted on the deflecting element.

b) Description of the Related Art

In a known clamping lock of this type (DE 39 30 613 C2), the pawl is formed as a one-armed lever which projects out of the housing at the top and is provided in the region of its free end with a cross-piece so as to form a Tee, wherein the portion of the cross-piece projecting on one side of the lever serves as a nose of the pawl and the portion projecting on the other side serves for actuation by the user. For this purpose, the pawl presses with its nose against the tension chain from the outer side of the housing and on the outside of the housing and presses the tension chain against the outer surface of the deflecting element. When the nose, which is shaped like a wide leg projecting approximately vertically from the pawl, makes contact from above on a chain link of the tension chain, which chain link lies flat, and the tension chain is pulled opposite to the tensioning direction, locking is brought about because the next chain link following the chain link that is located under the nose stops against the front edge of the locking leg with its protruding web and cannot travel further. Because of the very small contact surfaces, very high area pressures occur, wherein there is a risk that the front edge of the locking leg responsible for the locking effect will be damaged if the tension chain is subjected to sudden pulling. This can lead to an impairment of overall operating ability. Also, the known clamping lock can be opened manually after a locking process only after the tension chain has first been pulled somewhat in the tensioning direction, because the locking leg (nose) of the pawl initially still stops against the shoulder of the previously locked chain link when opening, which requires an increased expenditure of force. When the tension chain is pulled in the tensioning direction, the utilized geometry cancels the locking by the nose of the pawl, but a relatively powerful pulling is also required for this purpose, since the leading or starting angle of the tension chain running out of the housing of the clamping lock relative to the underside of the locking leg is relatively large and the opening force is accordingly high. On the whole, this known clamping lock runs relatively stiffly due to its design, which also impairs its operating ability.

OBJECT AND SUMMARY OF THE INVENTION

In this connection, the invention provides a remedy and proposes, as its primary object a clamping lock which offers a particularly smooth handling overall with improved operability.

According to the invention, this is achieved in a clamping lock of the type mentioned above in that the nose of the pawl is constructed as a shaped nose which can be introduced into the intermediate space between two longitudinal sides of a chain link of the tension chain and which, with its nose surface located in front in the direction of the locking position, constitutes a lengthening or extension, substantially in a straight line, of the outer surface of a pawl leg leading to the swivel pin of the pawl and is provided with a guide groove which is located in the center and extends into this outer surface of the pawl leg, the shape of this guide groove being adapted to the outer contour of the chain links of the tension chain.

First, by providing a shaped nose which can be introduced into the intermediate space between the side members of an individual chain link of the tension chain, the clamping lock, according to the invention, makes it possible for the shaped nose to engage between the side members of a chain link of the tension chain, which chain link is situated transverse to the shaped nose, wherein, as a result of the positive engagement achieved in this way, the attitude or position of the chain link can be fixed relative to the nose and also relative to the deflecting element. At the same time, due to the presence of the guide groove on the side of the shaped nose facing the tension chain and due to the outer surface of the pawl leg lying in an extension thereto and due to the fact that this groove surface is adapted to the outer contour of the chain links of the tension chain, the next chain link succeeding the chain link held by the shaped nose in the tensioning direction of the tension chain is held by this guide groove in the desired orientation and position relative to the other chain link and, when pulling is effected in the tensioning direction, is accordingly guided in a predetermined orientation to the underside of the pawl, which then automatically swivels up, until this pawl springs back into its locking position under the influence of pretensioning after this chain link passes through and, in so doing, simultaneously engages with its shaped nose in the following chain link, namely in the intermediate space between its side members. Therefore, when the tension chain passes through in the tensioning direction, an automatic alignment and guidance of the individual chain links is achieved while running over the deflecting element and running past the pawl, which prevents tilting of the tension chain in this region, ensures a particularly good alignment and guidance of the individual chain links, and accordingly facilitates operability overall. The automatic cancellation of locking by means of pulling in the tensioning direction is facilitated by the more precise guidance and position of the chain links, and handling is accordingly improved at the same time. When pulling in the closing direction, the clamping lock according to the invention operates very smoothly during the automatic cancellation of locking and while the tension chain is running through, wherein when pulling in the opposite direction, that is, when pulling in the direction for opening the chain, the desired locking occurs immediately in a dependably operating manner without resulting in unwanted deformations in the area in which the pawl, or its shaped nose, acts on the chain. The handling of the clamping lock is also facilitated in that the underside of the shaped nose is formed in a straight-line extension of the pawl leg extending toward the swivel pin of the pawl lever. The outer surface of the pawl lever accordingly extends in a straight line on this side, i.e., it lies in an outer closing plane. Accordingly, the chain links of the tension chain can be grasped in the guide groove on the underside of the pawl, or its shaped nose, over a particularly long length, i.e., the guiding action on the grasped link proceeds over a relatively long portion of the same and is accordingly particularly effective.

The clamping lock according to the invention has, in its entirety, an uncomplicated and simple construction and can also be manufactured economically, since all required shaping can be carried out already during the manufacture of the pawl by one tool.

In a particularly preferred manner, the pawl is arranged in the housing in such a way that it no longer projects into the area of the lateral slot in the housing in its fully open position, so that it can be guided into and out of the interior of the housing laterally in a particularly simple manner and completely without hindrance.

The shaped nose can be constructed in any manner suited to the intended purpose. However, it is particularly preferable that the shaped nose is provided on its outer surface remote of the deflecting element (that is, its upper surface) with an outwardly curved convex shape and also, in a particularly preferred manner, merges or passes into a curvature in the area of the projecting end of the nose. As a result of this rounded shape at the above-mentioned locations, the pawl can easily swing out of and into the locking position and the shaped nose can easily swing out of and into the associated chain link of the tension chain, which benefits and facilitates the actuation of the pawl and its automatic engagement with and disengagement from the locking position.

Another especially preferred construction of the clamping lock according to the invention consists in that the pawl is arranged in the housing in such a way that it projects out of the housing only by its actuating leg which is intended for manual actuation by the user, while the rest of the pawl, in particular the shaped nose, is located inside the housing, specifically over its entire swivel area. This results in the advantage that precisely this area of the pawl lever that is important for the locking action, including its engagement location with the tension chain, lies inside the housing of the clamping lock and is accordingly kept away to a great extent from external influences, which appreciably benefits the life and long-term operability of the clamping lock according to the invention.

In order to further improve handling, a suitable recessed grip is advantageously formed on the outer surface of the actuating leg of the pawl where the user applies force, wherein the recessed grip can also advantageously be provided with small grooves, raised portions or some other type of suitable surface structuring so as to prevent the finger from sliding off when actuating the pawl lever.

The housing and/or the deflecting element are/is advantageously made of sheet metal, wherein the deflecting element is especially preferably formed in one piece with the side walls of the housing. The pawl is preferably made of plastic, especially polycarbonate, because this not only simplifies and economizes on manufacture, but also results in favorable friction characteristics at the points of contact with the tension chain links which are formed of metal.

The shaping of the guide groove is selected so as to correspond to the outer shaping of the chain links of the tension chain so that there is particularly good guidance when a chain link of this kind partially runs into this groove with a portion of its outer surface and is to be guided therein. Since the links of many tension chains are formed of a wire having a circular cross section, the guide groove is provided in a particularly preferable manner in this case with a cross section in the shape of a circle segment.

It is also particularly advantageous that the depth of the guide groove increases with increasing distance from the end of the shaped nose, wherein the side member or front member of a chain link guided in the guide groove is held laterally increasingly toward the rear (i.e., with increasing distance away from the free end of the nose). This also facilitates entry into the guide groove into which the tension chain runs in a curved guide path. In a particularly preferable manner, the guide groove is constructed in such a way that it is open at its end remote of the shaped nose in that it terminates, e.g., in a forked end area, wherein the swivel axis or swivel pin extends through the prongs of this forked end area. Accordingly, it is possible, as the case may be, that entry into the guide groove can also be effected through this open end or that a chain link to be received can be swiveled in at this location in such a way that this open end cross section is also available for the swiveling in process.

The invention, in principle, is explained more fully hereinafter by way of example with reference to the drawing.

DESCRIPTION OF THE PREFERRED EMBODIMENTS

Figure 1:
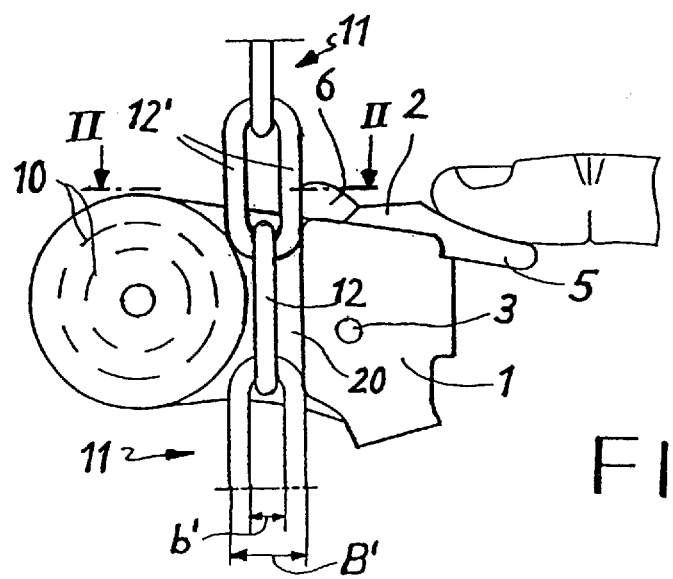
FIG. 1 shows a side view of a clamping lock according to the invention, wherein the pawl is brought into its fully open position and a tension chain is introduced through the lateral housing slot.
Figure 2:
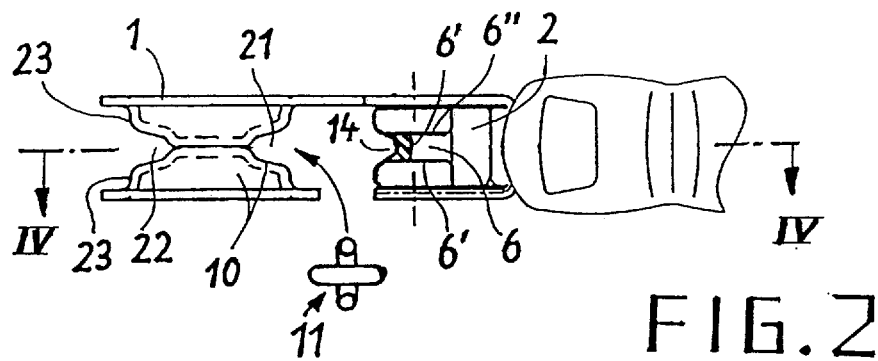
FIG. 2 is a view according to II—II in FIG. 1.
Figure 4:
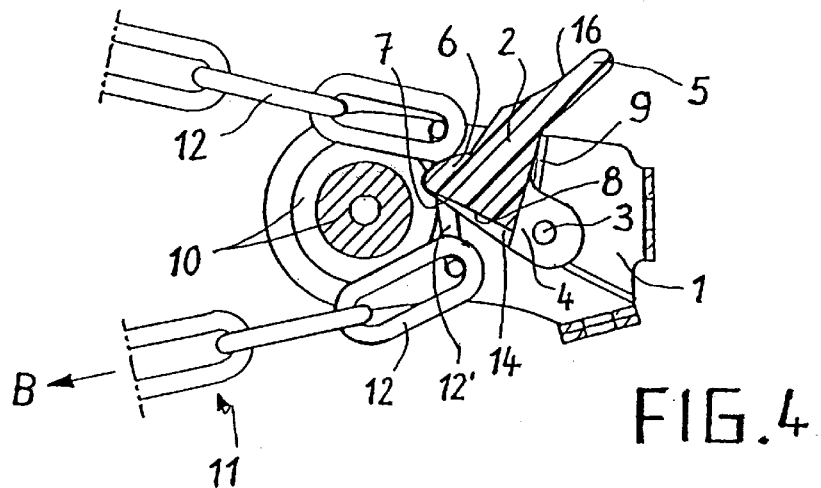
FIG. 4 shows a sectional view according to section position IV—IV in FIG. 2, but in which the tension chain is already introduced, in the locking position of the pawl.

First, reference is had to the views shown in FIGS. 1, 2 and 4. FIG. 1 shows a side view of a clamping lock with a housing 1 which is provided, on its side facing the observer, with an insertion slot 20 which extends over the entire height of the housing and through which a tension chain 11 can be introduced from the side into the interior of the housing 1, as is indicated by the arrow at the tension chain 11 in FIG. 2, wherein FIG. 2 shows a top view in partial section according to section position II—II in FIG. 1.

As is shown in FIG. 1, the tension chain 11 is introduced laterally in such a way that a chain link 12 of the tension chain 11 whose link plane is oriented in the insertion direction of the slot is guided through this slot at the narrowest point of the slot. In this regard, the insertion slot 20 at its narrowest location is smaller that the width B' of the chain links 12 of the tension chain 11, as can also be clearly seen from FIG. 2, so that the tension chain 11 in the inserted state cannot run out of the slot 20 when running through the housing 1.

A pawl 2 is arranged inside the housing 1 so as to be swivelable about a swiveling pin 3. As is illustrated in FIG. 4, which shows a section through the clamping lock according to FIG. 2 corresponding to section position IV—IV, wherein, however, the tension chain 11 has already been inserted and the pawl 2 is in its locking position, the pawl 2 comprises a generally U-shaped or V-shaped part which has a leg 4 that is supported in the area of one of its ends so as to be swivelable about the swiveling pin 3 and an actuating leg 5 which projects upward from the leg 4 (according to the view in FIG. 4) and juts out of the housing 1. As is shown in FIG. 1, a user's finger can swivel the pawl 2 out of its locking position into an open position by means of this actuating leg 5.

Also arranged within the housing 1, as is shown particularly in FIGS. 2 and 4, is a deflecting element 10 which serves to deflect the pull chain 11 inserted in the housing 1 as is shown in FIG. 4. Inside the housing, the deflecting element 10 has a circumferentially extending shaped surface 21 (see FIG. 2) which is shaped in such a way that it forms a recess 22 in its center region, wherein the side flanks of this recess 22 pass at their radial end into shoulders 23 which face outward axially. The shape of the circumferentially extending recess 22 is selected in such a way that a chain link 12 of the tension chain 11 can slide into this recess 22 by its side members 12', wherein the bottom curvature of the recess 22 corresponds to the radius of curvature R of the side members 12' of the chain links of the tension chain 11. The shoulders 23 which run outward axially are arranged at a distance from the base of the recess 22 such that the chain links 12 of the tension chain 11 which succeed the chain links 23 projecting into the recess 22 when running around the deflecting element 10 and which are oriented approximately at a right angle to these chain links 12 can be supported on these shoulders 23 by both of their side members 12'.

Like the housing 1, the deflecting element 10 is also formed of a sheet metal construction and is suitably connected in one piece with the side wall or side walls of the housing 1 (manufacture is carried out, for example, by a suitable deep-pressing technique proceeding from the respective side of the housing).

Figure 3:
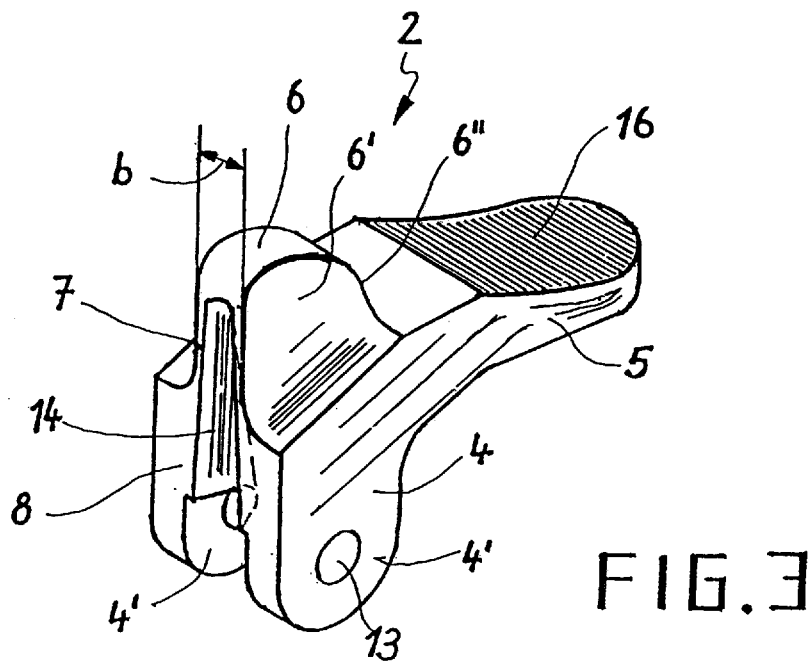
FIG. 3 shows an enlarged perspective view of a pawl for use in a clamping lock according to the invention.

The pawl 2 which is swivelable in the housing 1 around the swiveling pin 3 is shown in an enlarged perspective view in FIG. 3.

The pawl 2 is formed by a one-piece plastic part, preferably made from polycarbonate, and has two legs 4 and 5, wherein an acute angle is formed between the legs 4 and 5. The free end of leg 4 terminates in two prongs 4', each of which is provided with a through-hole 13 through which the swivel pin 3 projects, wherein the prongs 4' are articulated at the housing 1 by means of this swivel pin 3. At its side remote of the leg 5, leg 4 has an outer boundary surface 8 which (with the exception of the rounded portions at the free end of the two prongs 4') lies in a plane and, in an extension of this plane, passes in a straight line into the outer surface 7 of the shaped nose 6 located on the same side.

As is shown by the shape illustrated in FIG. 3 (it is expressly noted that the graphic representation in FIG. 3 is substantial to the invention), the outer surface 7 of the shaped nose 6 passes into a rounded portion which forms, and extends circumferentially around, the free end of the shaped nose 6, wherein this shaped nose 6 has an outwardly curved convex surface on the side surface 6" located opposite from the outer surface 7.

A recessed grip 16 with transversely extending ribs is formed in the end region of the side of the actuating leg 5 shown on top in FIG. 3, so that the user can comfortably apply a finger thereto (FIG. 1) in order to actuate it.

A centrally arranged groove 14 extending in the longitudinal direction of the leg 4 is formed on the outer surface 7 of the shaped nose 6 lying on the pawl 2 in an extension of the outer surface 8 of the leg 4. As can be seen from FIG. 3, this groove 14 increases in depth with increasing distance from the free end of the shaped nose 6. This groove 14 proceeds from the front in the shaped nose 6 into the leg 4, opening out freely at a location at which the leg 4 divides into its two prongs 4'.

As can further be seen from FIG. 3, the two lateral boundary surfaces 6' of the shaped nose 6, starting from the tip of the shaped nose 6, initially extend parallel to one another and then, in their subsequent end region, open into the surface of the actuating leg 5 in a curving manner. In this connection, the width b of the shaped nose 6 (see FIG. 3) is selected such that it is slightly smaller than the inner width b' of the chain links 12 of the tension chain 11, so that it is possible to easily introduce the shaped nose 6 between the side members 12' of the chain links 12 of the tension chain 11.

As is shown in the view in FIG. 4, the pawl 2 is pretensioned in its closing position (shown in FIG. 4) by means of a leaf spring 9, in which closing position the pawl 2 is pressed against the deflecting element 10, the side areas of the pawl 2 preferably contacting the side areas of the deflecting element 10, e.g., in the area of the lateral shoulders 23. In its locking position, the shaped nose 6 projects in between the side members 12' of a chain link 12 of the tension chain 11, wherein each of the two side members 12' of this chain link 12 lies next to one of the two side flanks 6' of the shaped nose 6. At the same time, these side members 12' also rest on the lateral shoulders 23 of the deflecting element 10 (in their middle area of extension), so that this chain link 12 is held in its entirety by the shaped nose 6 and the lateral shoulders 23 of the deflecting element 10 in a precisely predetermined alignment, namely, parallel to the center axis of the annularly extending deflecting element 10.

When the tension chain 11 is pulled in the direction of arrow B, i.e., in a direction opposite to the tensioning direction, the tension chain 11 is locked. As can be seen from FIG. 4, the locking is effected in that a chain link 12 of the tension chain 11 rests against the (upper, as seen in FIG. 4) curved outer surface of the shaped nose 6 and presses the latter into its closing position, so that a movement of the tension chain 11 is blocked by means of positive engagement, wherein a comparatively large contact surface is formed due to the rounded surfaces of the chain link 12 and shaped nose 6 which abut against one another.

Figure 5:
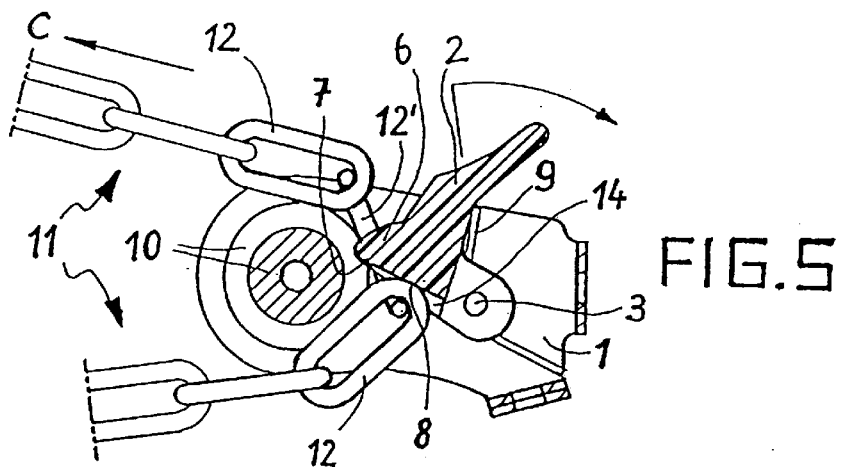
FIG. 5 shows the sectional view from FIG. 4, but in which the tension chain is pulled in the tensioning direction, at the moment that the following link of the tension chain runs into the guide groove.
Figure 6:
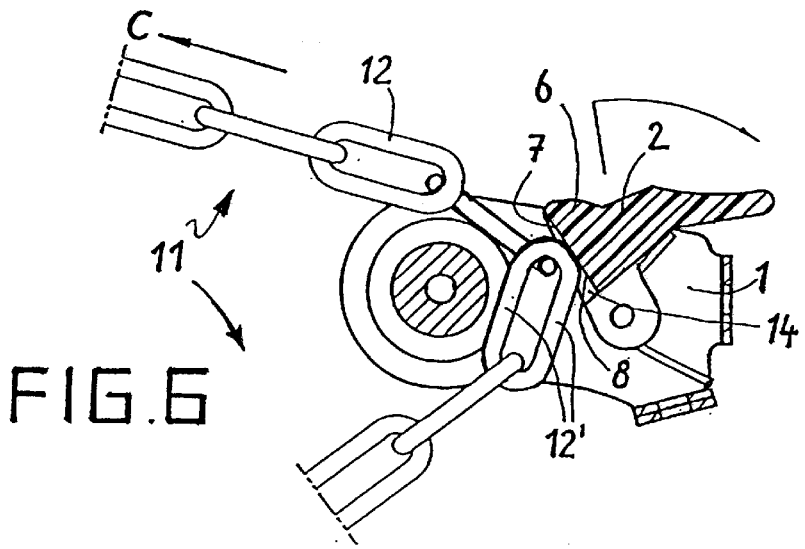
FIG. 6 shows the view from FIG. 5, but in a position in which the chain link of the tension chain running into the guide groove has already tilted the pawl somewhat in the direction of its open position.
Figure 7:
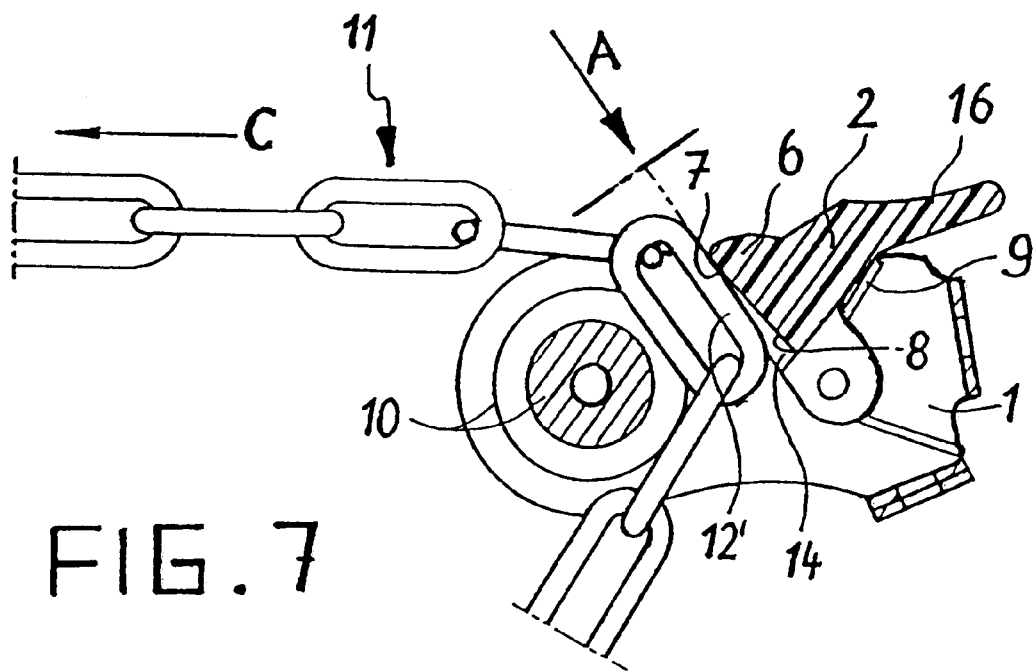
FIG. 7 shows the view from FIG. 6, but in which the chain link of the tension chain that has run into the guide groove has already advanced under the shaped nose at its front end as seen in the pulling direction, and the pawl is swung almost into its completely open position.

On the other hand, if the tension chain 11 is pulled in the tensioning direction, that is, in the opposite direction, which forms the basis of the views in FIGS. 5 to 7 (see arrow C), the locking brought about by the pawl 2 in frictional engagement and positive engagement is immediately cancelled and the tension chain 11 can easily run through the housing 1 in this direction.

FIGS. 5 to 7 show this running through of the tension chain 11, wherein the kinematics of the cancellation of the locking by the pawl 2 can also be seen from FIGS. 5 to 7.

In a view that is basically identical to the view in FIG. 4, FIG. 5 shows the case in which the tension chain 11 which is pulled in the tensioning direction (arrow C) is already displaced relative to the view in FIG. 4 by a small distance in the direction of arrow C, wherein, in this case, on the side of the pawl 2 on which the guide groove 14 is formed (the lower side as viewed in FIGS. 5 to 7), the next chain link 12 of the tension chain 11 runs precisely into the guide groove 14 by its front shoulder, as viewed in the movement direction, until contacting the base of the guide groove 14.

FIG. 6 shows the arrangement after the tension chain 11 has moved farther by a certain distance in the tensioning direction C. The portion of the chain link 12 received in the guide groove 14 of the pawl 2, which portion is located in the front as viewed in the pulling direction, has moved upward around the deflecting element 10 by a certain distance under the influence of the pulling force, so that the pawl 2 is swiveled somewhat in its opening direction against the action of a pretensioning pressure spring 9. As pulling continues in the tensioning direction C, this chain link 12 of the tension chain 11 which is partially received in the guide groove 14 travels still farther in the tensioning direction (that is, upward in the views shown in the Figures) and, in so doing, opens the pawl 2 still further in the opening direction against its pretensioning, wherein the member 12' of the respective chain link 12 lying on the underside of the pawl 2 simultaneously projects with increasing length into the guide groove 14 on its outer side facing the chain link 12. FIG. 7 shows the state in which the front area of this chain link 12, as seen in the pulling direction, has already passed under the shaped nose 6. At the same time, the following chain link 12 of the tension chain 11, which following chain link 12 is rotated by 90° relative to the chain link projecting into the guide groove 14, already rests again on the lateral shoulder 23 of the deflecting element 10 by its two side members, so that it runs in the correct position under the pawl 2 in such a way that, after the chain link 12 of the tension chain 11 received in the guide groove 14 runs out of the guide groove 14, the pawl 2 is automatically reset in its locking position under the influence of the pretensioning spring 9 and can engage by its shaped nose 6 in the succeeding chain link 12 that is already correspondingly aligned.

Figure 8:
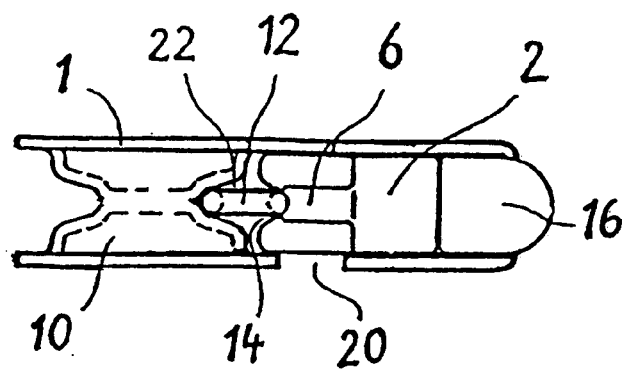
FIG. 8 shows a view according to arrow A in FIG. 7.

Finally, FIG. 7 shows a top view according to arrow A from FIG. 8, wherein, however, only the chain link 12 of the tension chain 11 projecting into the guide groove 14 is shown, and the preceding chain links in the pulling direction are omitted for improved clarity.

While the foregoing description and drawings represent the present invention, it will be obvious to those skilled in the art that various changes may be made therein without departing from the true spirit and scope of the present invention.

FIG. 8 clearly shows how the chain link 12 of the tension chain 11 which is located precisely between the pawl 2 and the deflecting element 10 is guided with its one side member in the guide groove 14 of the shaped nose 6 and with its other side member in the recess 22 of the deflecting element 10. The pretensioning of the pawl 2 ensures that this chain link 12 always contacts the base of the guide groove 14 as well as the base of the recess 22 and accordingly ensures a precise alignment and guidance of the chain link when passing through the housing 1, resulting in particularly smooth running, low friction forces, and an advantageous operability.

What is claimed is:

1. A clamping lock comprising:

a housing having a deflecting element for a tension chain which runs over it;

a pawl swivelable between an open position and a locking position and which is pretensioned in a springing manner in its locking position against the deflecting element;

said pawl having a projecting nose by which the tension chain can be locked so as to prevent it from running through in the tensioning direction;

said housing having a slot that is arranged on a side of the housing and extending over the entire height of the housing, through which slot the tension chain is introduced laterally into the housing from outside and can be fitted on the deflecting element;

said nose of the pawl being constructed as a shaped nose which can be introduced into an intermediate space between two longitudinal sides of a chain link of the tension chain and which, with a nose surface located in the front in the direction of the locking position, constitutes an extension, substantially in a straight line, of the outer surface of a pawl leg leading to a swivel pin of the pawl and is provided with a guide groove which is located in the center and which extends into said outer surface of the pawl leg; and wherein a chain link of said tension chain can be at least partially introduced into the guide groove by an outer side thereof.

2. The clamping lock according to claim 1, wherein the pawl is arranged in the housing in such a way that it does not project into the area of the slot in the housing in its open position.

3. The clamping lock according to claim 1, wherein said shaped nose has an outwardly curved shape at an outer surface remote of the deflecting element.

4. The clamping lock according to claim 1, wherein the shaped nose is rounded in the region of the projecting end of the nose.

5. The clamping lock according to claim 1, wherein the pawl projects from the housing only by an actuating leg.

6. The clamping lock according to claim 5, wherein a recessed grip is formed on the outer surface of the actuating leg remote of the housing for application of a user's finger.

7. The clamping lock according to claim 1, wherein the housing and the deflecting element are made of sheet metal.

8. The clamping lock according to claim 1, wherein the pawl is made of plastic.

9. The clamping lock according to claim 8, wherein the plastic is polycarbonate.

10. The clamping lock according to claim 1, wherein the guide groove has a circular cross section.

11. The clamping lock according to claim 1, wherein the depth of the guide groove increases as its distance from the end of the shaped nose increases.

12. The clamping lock according to claim 1, wherein the guide groove is open at its end remote of the shaped nose.

* * * * *